United States Patent
Oonishi (10) Patent No.: US 10,951,882 B2
(45) Date of Patent: Mar. 16, 2021

(54) HEAD MOUNTED DISPLAY DEVICE AND METHOD FOR PROVIDING VISUAL AID USING SAME

(71) Applicant: Maxell, Ltd., Kyoto (JP)

(72) Inventor: Kunikazu Oonishi, Tokyo (JP)

(73) Assignee: MAXELL, LTD., Kyoto (JP)

( * ) Notice: Subject to any disclaimer, the term of this patent is extended or adjusted under 35 U.S.C. 154(b) by 249 days.

(21) Appl. No.: 15/577,872

(22) PCT Filed: Jun. 19, 2015

(86) PCT No.: PCT/JP2015/067791
§ 371 (c)(1),
(2) Date: Nov. 29, 2017

(87) PCT Pub. No.: WO2016/203654
PCT Pub. Date: Dec. 22, 2016

(65) Prior Publication Data
US 2018/0152694 A1    May 31, 2018

(51) Int. Cl.
*H04N 13/344* (2018.01)
*H04N 13/122* (2018.01)
(Continued)

(52) U.S. Cl.
CPC ....... *H04N 13/344* (2018.05); *G02B 27/0172* (2013.01); *G02B 27/0179* (2013.01);
(Continued)

(58) Field of Classification Search
CPC .. H04N 13/344; H04N 13/128; H04N 13/383; H04N 13/398; G06T 7/70;
(Continued)

(56) References Cited

U.S. PATENT DOCUMENTS

| | | | |
|---|---|---|---|
| 5,844,530 A | 12/1998 | Tosaki | |
| 2005/0174470 A1* | 8/2005 | Yamasaki | G03B 13/22 348/345 |

(Continued)

FOREIGN PATENT DOCUMENTS

| | | |
|---|---|---|
| CN | 101175158 A | 5/2008 |
| CN | 103190883 A | 7/2013 |

(Continued)

OTHER PUBLICATIONS

International Search Report of PCT/JP2015/067791 dated Sep. 1, 2015.

(Continued)

*Primary Examiner* — Jamie J Atala
*Assistant Examiner* — Hesham K Abouzahra
(74) *Attorney, Agent, or Firm* — Mattingly & Malur, PC (57) ABSTRACT

An external scene image captured by an external scene imaging electronic camera attached to a head mounted display (HMD) is projected and displayed onto an image display screen arranged in front of the eyes of the user as a virtual image with a suitable viewing distance corresponding to the visual acuity of the user. At this time, for each object image presented in the virtual image of the external scene image, the virtual image is processed and formatted to add a predetermined degree of binocular disparity and image blur to the virtual image projected and displayed on the right and the left image display screen on the basis of a predetermined converted distance calculated from the real distance of each object. Thus, the user is given a sense of a realistic perspective for the virtual image of the external scene, free of the discomfort or unease.

12 Claims, 9 Drawing Sheets

(a) CASE WHERE WATCHING TARGET OBJECT IS LOCATED AT LONG DISTANCE (b) CASE WHERE WATCHING TARGET OBJECT IS LOCATED AT SHORT DISTANCE (51) Int. Cl.
| | |
|---|---|
| *H04N 13/117* | (2018.01) |
| *G02B 30/00* | (2020.01) |
| *G06T 7/70* | (2017.01) |
| *H04N 13/128* | (2018.01) |
| *H04N 13/383* | (2018.01) |
| *H04N 13/398* | (2018.01) |
| *G02B 27/01* | (2006.01) |
| *G06F 3/16* | (2006.01) |
| *G10L 15/00* | (2013.01) |
| *G10L 15/08* | (2006.01) |
| *H04N 5/64* | (2006.01) |
| *G02C 11/00* | (2006.01) |

(52) U.S. Cl.
CPC ............ *G02B 30/00* (2020.01); *G06F 3/167* (2013.01); *G06T 7/70* (2017.01); *G10L 15/005* (2013.01); *G10L 15/08* (2013.01); *H04N 13/117* (2018.05); *H04N 13/122* (2018.05); *H04N 13/128* (2018.05); *H04N 13/383* (2018.05); *H04N 13/398* (2018.05); *G02B 2027/014* (2013.01); *G02B 2027/0134* (2013.01); *G02B 2027/0138* (2013.01); *G02B 2027/0178* (2013.01); *G02B 2027/0185* (2013.01); *G02C 11/10* (2013.01); *G10L 2015/088* (2013.01); *H04N 5/64* (2013.01)

(58) Field of Classification Search
CPC . G02B 27/0172; G02B 27/0179; G06F 3/167; G10L 15/005; G10L 15/08
See application file for complete search history.

(56) References Cited

U.S. PATENT DOCUMENTS

| | | | |
|---|---|---|---|
| 2005/0231599 | A1 | 10/2005 | Yamasaki |
| 2006/0098864 | A1* | 5/2006 | Ziel .................... G01S 7/52068 |
| | | | 382/154 |
| 2015/0244903 | A1* | 8/2015 | Adams ................ G02B 27/017 |
| | | | 348/376 |
| 2017/0038607 | A1* | 2/2017 | Camara ................... G02C 11/10 |
| 2017/0200296 | A1* | 7/2017 | Jones ....................... G06T 11/60 |
| 2017/0351665 | A1* | 12/2017 | Kim .................... G06F 3/04883 |
| 2019/0020823 | A1* | 1/2019 | Jeon ................... H04N 5/23296 |

FOREIGN PATENT DOCUMENTS

| | | | |
|---|---|---|---|
| CN | 104216126 | A * | 12/2014 |
| CN | 104216126 | A | 12/2014 |
| JP | 08-160349 | A | 6/1996 |
| JP | 2000-089157 | A | 3/2000 |
| JP | 2005-303843 | A | 10/2005 |
| JP | 2014-106641 | A | 6/2014 |
| JP | 2015-032131 | A | 2/2015 |
| WO | 2015/015811 | A1 | 2/2015 |

OTHER PUBLICATIONS

Chinese Office Action mailed in corresponding Chinese Application No. 201580080739.0 dated Jul. 15, 2019.

* cited by examiner

(a) CASE WHERE WATCHING TARGET OBJECT IS LOCATED AT LONG DISTANCE (b) CASE WHERE WATCHING TARGET OBJECT IS LOCATED AT SHORT DISTANCE

(a) VIRTUAL IMAGE OF LEFT EYE (b) VIRTUAL IMAGE OF RIGHT EYE

HEAD MOUNTED DISPLAY DEVICE AND METHOD FOR PROVIDING VISUAL AID USING SAME

TECHNICAL FIELD

The present invention relates to a wearable-type information display system, and more particularly to a head mounted display device (hereinafter, referred to as an HMD) that is mounted in a user's head portion and has a function for displaying predetermined video information to the front side of user's eyes and an application system thereof.

BACKGROUND ART

In recent years, information video display devices using so-called HMDs of a goggle type or a glass type mounted in a user's head portion have been spread rapidly.

Such an HMD has a function for projecting a virtual image having a predetermined visible distance seen from a user, and a necessary information video can be presented to the user as a virtual image by using this function.

Meanwhile, there are individual differences and variations in human's visible ability. For example, generally, a near-sighted person has visual ability that is not different much from good visual ability in a case where an object located at a relative short distance such as a book or a newspaper is viewed and has a characteristic in which the visual ability rapidly decreases as a visual recognition object becomes far apart. To the contrary, a far-sighted person has a characteristic in which the visual ability is lower at a short distance than at a long distance.

In addition, in a middle/old-age group of which population rapidly increases by reflecting an aging society of recent years, while relatively good visual ability is secured at an intermediate distance, visual ability for a short distance and a long distance rapidly decreases. In other words, generally, a visible distance range of the middle/old age group in which the visual ability is in some degree or higher relative to a young age group tends to be narrowed. This is so-called presbyopia.

In consideration of differences and variations in the visual ability of individual persons, for example, in JP 2000-89157 A (Patent Document 1), an HMD configuration capable of changing a visible distance of a virtual image such that a virtual image having an appropriate visible distance can be projected according to a user's visual ability has been disclosed.

CITATION LIST

Patent Document

Patent Document 1: JP 2000-89157 A

SUMMARY OF THE INVENTION

Problems To Be Solved by the Invention

When an HMD having a function for changing the visible distance of a virtual image as disclosed in Patent Document 1 is used, for example, by imaging an external scene viewed by a user using a video camera or the like and performing projection display of a virtual image having a visible distance that is the most appropriate for the user's visual ability, the external scene can be viewed by the user constantly in a good visual recognition state regardless of differences and variations in the visual ability of each user. Thus, a visual aid function such as visual correction glasses optimized for each user can be included in the HMD.

However, when videos of all the target objects within an imaging visual field are simply projected to a same virtual image position, all the depth perception senses for a target object that is sensed and acquired when an external scene is viewed by the naked eyes are lost, and only a monotonous video can be visually recognized, whereby a very strange feeling relative to that from a scene viewed by the naked eyes occurs.

An object of the present invention, in consideration of the problems described above, to provide a high-functionality visual aid system capable of securing a good visual recognition performance while depth perception similar to that of the case of naked eyes is maintained by using an HMD.

Solutions to Problems

In order to solve the problems described above, the present invention, for example, employs configurations described in the claims. While the present application includes a plurality of means solving the problems described above, for example, there is provided a head mounted display device that is mounted in a head portion of a user and displays information videos in front of the eyes. The head mounted display device is configured to include: an external scene imaging unit that captures an external scene in a visual field area including a direct visually-recognized visual field of the user; a virtual image projector that projects and displays the external scene video captured by the external scene imaging unit on left-eye and right-eye video display screens separately arranged in front of the eyes of the user as left-eye and right-eye virtual image videos having a predetermined visible distance; an within-visual-field target object distance detector that detects an actual distance up to a target object shown inside the external scene video captured by the external scene imaging unit from the user; and a perspective video generator that generates virtual image videos to which depth perception is added by performing a predetermined treatment of the left-eye and right-eye virtual image videos on the basis of actual distance information of the target object detected by the within-visual-field target object distance detector.

Effects of the Invention

According to the present invention, a visual aid system capable of securing good visual ability in accordance with individual visual ability while maintaining the depth perception by using an HMD can be realized.

MODE FOR CARRYING OUT THE INVENTION

Hereinafter, embodiments of the present invention will be described with reference to the drawings.

Figure 1:
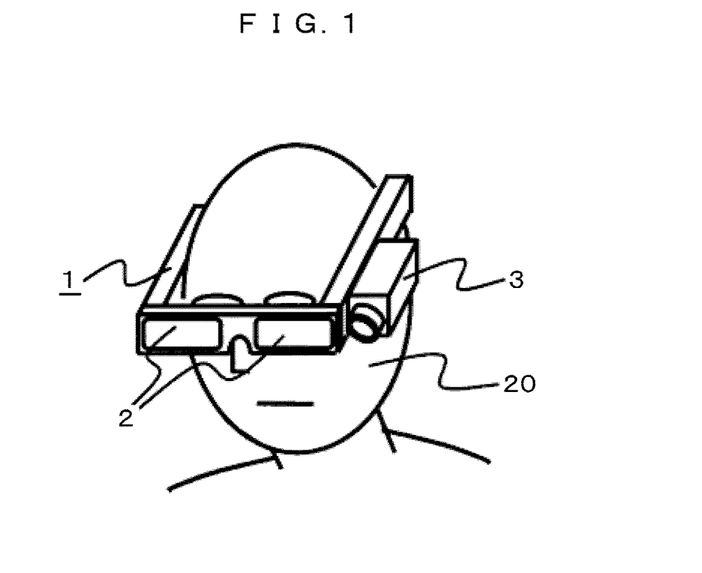
FIG. 1 is a perspective view illustrating overviews of an HMD that is a premise of the present invention and an application system thereof.

First, overviews of an HMD that is a premise of the present invention and an application system thereof will be described. FIG. 1 is a perspective view illustrating overviews of an HMD and an application system thereof. Hereinafter, an HMD application system will be described as a visual aid system compensating the visual recognition performance of user's naked eyes.

In the case illustrated in FIG. 1, the HMD 1 is mounted in a head portion of a user 20. The HMD 1 is a so-called video see-through type HMD having a function for projecting and displaying a predetermined video on a non-transparent video display screen (video screen device) 2 arranged in front of the left and right eyes of a user 20. In other words, at least when the HMD 1 is in an operating state, video display screens 2 are in a non-transparent state, and accordingly, the user 20 cannot visually recognize the outside through the naked eyes but visually recognizes only videos that are projected onto the video display screens 2.

In addition, in the HMD 1, an electronic camera 3 used for imaging an external scene arranged on the periphery of the naked eyes of the user is included in addition to the video display screens 2. The electronic camera 3 used for imaging an external scene is installed to image an external scene in a direction that is almost the same as a visual line direction of the user 20 wearing the HMD 1, has a function capable of imaging an external scene in a visual field that is almost equal to or larger than a naked-eye visual field of the user 20, in other words, a function for imaging an external scene in a visual field area including a direct visually-recognized visual field as electronic video information, and has a sufficiently high imaging performance (resolution, MTF, and the like) relative to the visual recognition performance using the naked eyes of the user. In addition, the electronic camera 3 may have a depth of field that is sufficiently deep relative to a depth of field according to viewing through naked eyes.

Furthermore, in the electronic camera 3, an automatic focus function capable of automatically adjusting the focus to a predetermined target object within an imaging visual field is also included. As an object to which the focus is adjusted may be a target object that is present at the center of the imaging visual field, and, for example, as will be described later, a certain visual line detecting device detecting the visual line direction of a user may be arranged, and the focus may be adjusted to a target object present in the visual line direction. In addition, a device that images and stores a plurality of pieces of video information having the focuses sequentially adjusted to a plurality of target objects having mutually-different distances from the user within the imaging visual field and generates a video called a "pan focus" or a "deep focus" having the focus adjusted over a wide distance range from a short distance to a long distance by composing the plurality of pieces of video information may be included.

Furthermore, the electronic camera 3 may include a function for imaging an external scene by zooming up to a predetermined magnification ratio in accordance with an instruction from the user 20.

The HMD 1 has a distance measurement function for measuring a distance up to each target object within the visual field that is imaged by the electronic camera 3 used for imaging an external scene. As a specific execution means of this distance measurement function, the automatic focus function of the electronic camera 3 may be used, or a technique for detecting a distance from a parallax between videos of a target object that are independently captured by two electronic cameras arranged to be separate by a predetermined distance from each other may be used. In addition, any means may be used such as additional arrangement of a distance measurement sensor using infrared rays, ultrasonic waves, or the like as long as the means can realize a predetermined distance measurement function.

The videos of an external scene that are captured or generated as described above are projected and displayed on the video display screens 2 as a virtual image by using a virtual image projector included in the HMD 1.

Figure 2:
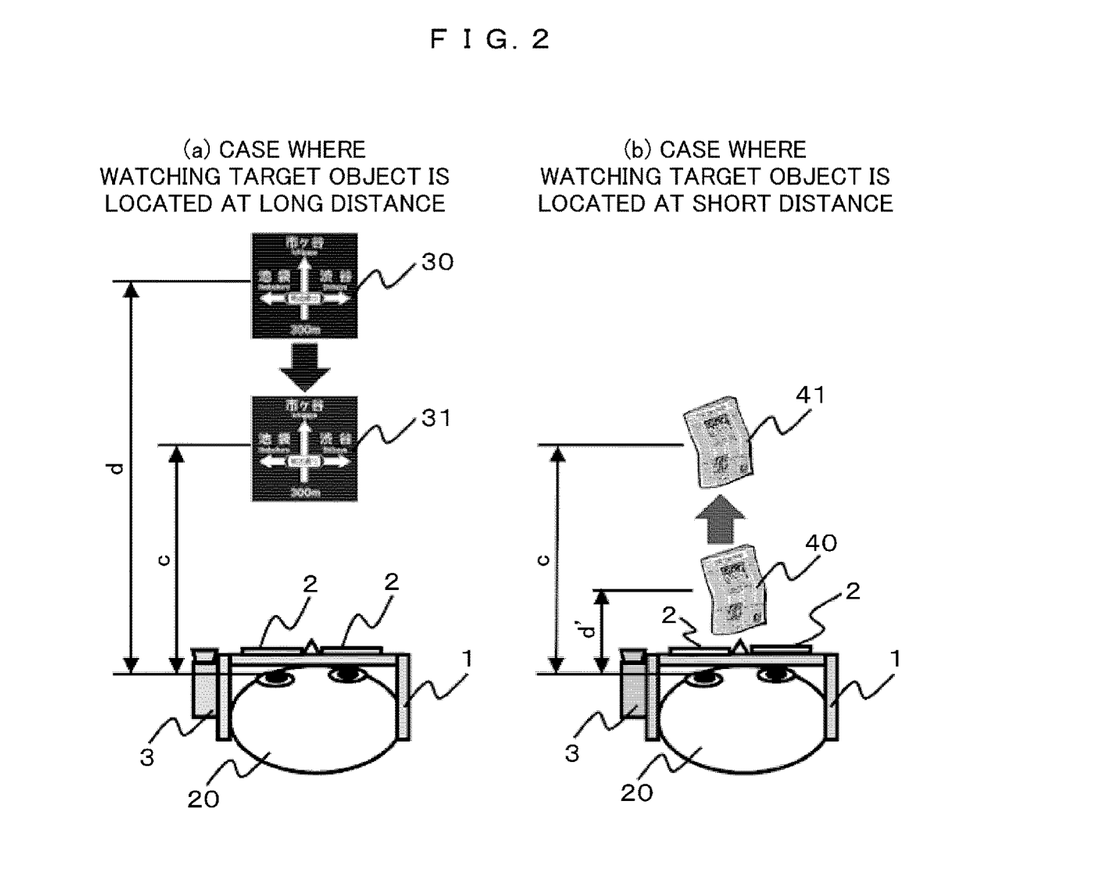
FIG. 2 represents an explanatory diagram of virtual image projection that is a premise of the present invention.

At this time, for example, in a case where a target object 30 that is at a relative long distance such as a traffic sign illustrated in FIG. 2(*a*) is watched and, to the contrary, also in a case where a target object 40 that is present at a relative short distance such as a newspaper or a book illustrated in FIG. 2(*b*) is watched, virtual images 31 and 41 having an appropriate visible distance c at which a best visual recognition performance is acquired by the user regardless of a distance between the user and the watching target object are projected and displayed. Accordingly, the user can visually recognize an external scene similar to that at the time of viewing through naked eyes constantly in a good visually recognized state regardless of differences and variations in the visual ability of the user 20 in accordance with the actual distances d and d' of the watching target objects 30 or 40 or the like.

Figure 3:
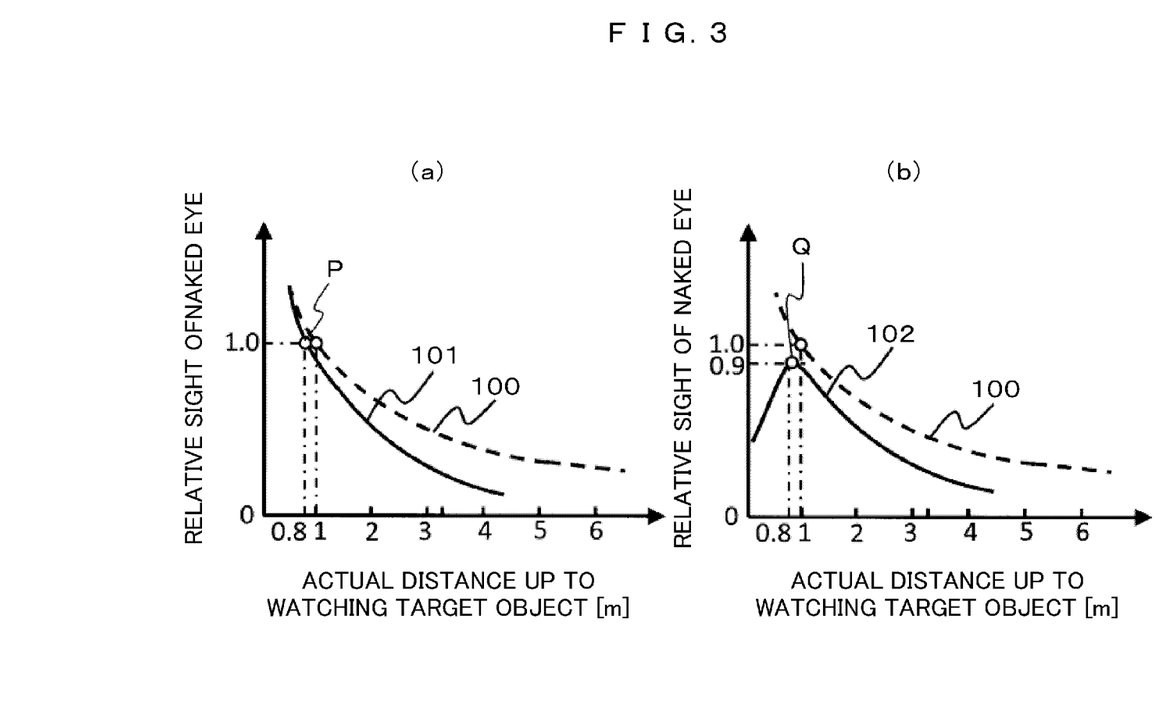
FIG. 3 represents line drawings that illustrate relations between an actual distance up to a watching target object and relative sight at the time of viewing using naked eyes that are a premise of the present invention.

Meanwhile, the appropriate visible distance c of a virtual image described above may be determined as below. FIG. 3 are examples in which relations between an actual distance up to a watching target object and relative sight (a relative value of a target object visual recognition performance) at the time of visual recognition using naked eyes (hereinafter, such graphs will be described also as relative sight characteristic diagrams). In both the graphs, the horizontal axis takes an actual distance up to a watching target object, and the vertical axis takes a relative sight value of a case where sight of a case where a person having good sight views a target object that is separate by a distance of 1 m through naked eyes is 1.0. Generally, in the case of naked-eye viewing with good sight, a relative sight characteristic diagram, as denoted by a broken line 100 in each diagram, is approximately in inverse proportion to the actual distance.

In contrast to this, a solid line 101 illustrated in FIG. 3(*a*) illustrates an example of a relative sight characteristic diagram of a near-sighted person. A near-sighted person has a small difference from good relative sight in a case where a distance up to a target object is relatively short and has relative sight that tends to rapidly decrease according to an increase in the distance. Thus, in a case where a user has such a sight characteristic of near sight, for example, the actual distance (in the example illustrated in FIG. 3(a), 0.8 m) of the target object located at a point P at which relative sight that is equivalent to relative sight of 1.0 in a good sight characteristic can be secured may be set as the appropriate visible distance c of the virtual image described above.

On the other hand, a far-sighted person, although not illustrated in the drawing, has relative sight that is equivalent to or better than good relative sight at a relatively long distance and has relative sight at a short distance that tends to be markedly worsen than the good relative sight. Thus, also in a case where a user has such a sight characteristic of far sight, the actual distance of a target object (located at a relatively long distance) at which relative sight that is approximately equivalent to the good sight characteristic can be secured may be set as the appropriate visible distance c of the virtual image.

A solid line illustrated in FIG. 3(b) illustrates an example of a relative sight characteristic diagram of a person having presbyopia. In the case of presbyopic sight, the sight tends to be worse than normal sight at a short distance and also at a long distance, and a point Q at which the relative sight is best is present near an intermediate distance (in the example illustrated in FIGS. 3(b), 0.8 m to 1.0 m). Thus, the actual distance of the target object of this Q point may be set as the appropriate visible distance c of the virtual image.

The technique for determining the appropriate visible distance c of the virtual image described above is merely an example, and this embodiment is not limited to the determination method described above. In the human relative sight characteristic, there are large differenced and variations due to various factors such as individual differences, age differences, an effect of the surrounding environment, and the like. The appropriate visible distance c of a virtual image according to this embodiment may be arbitrarily determined according to the visual ability of each user.

In addition, by mounting a predetermined visual aid glass lenses between the display screens 2 and the eyeballs of the user 20, the sight of the user side may be configured to be corrected such that an arbitrary visible distance becomes an appropriate visible distance.

In order to arbitrarily adjust the visible distance of a projected virtual image to an appropriate visible distance of each user as described above, while a function for appropriately changing and adjusting the visible distance of the virtual image needs to be included. For such a function, for example, like the configuration as described in Patent Document 1 described above, a known virtual image visible distance changing means may be used such as arrangement of a device that mechanically moves at least a part of an optical system generating the virtual image along an optical axis.

By using the configuration as described above, a user can utilize the HMD as a high-functionality visual aid system capable of visually recognizing an external scene or a visual recognition target object well regardless of a difference or a variation in the visual ability.

However, in a case where the HMD is utilized as the visual aid system by using the technique described above, there is concern that an important problem described below occurs.

In other words, in a case where a captured external scene video is projected and displayed as a virtual image in accordance with an appropriate visible distance of a user, the user can reliably visually recognize an external scene constantly in a good visual recognition state regardless of the distance up to the watching target object. However, since all the target object videos within a visual field are displayed at the same visible distance as virtual images, a depth perception sense according to the actual distance of each target object is completely lost, and only a planar scene can be recognized. For this reason, a user feels remarkable strangeness and unpleasantness in accordance with the lack of depth perception unlike in naked-eye viewing.

Thus, a new virtual image display method or a new virtual image display device is necessary which is capable of eliminating a strange feeling or an unpleasant feeling from a user by reliably reproducing depth perception felt by the user in a case where an external scene is viewed through the naked eyes as possibly while maintaining a good visually-recognized state by projecting a captured external scene video as a virtual image in accordance with an appropriate visible distance. Hereinafter, specific embodiments thereof will be described.

Embodiment 1

Figure 4:
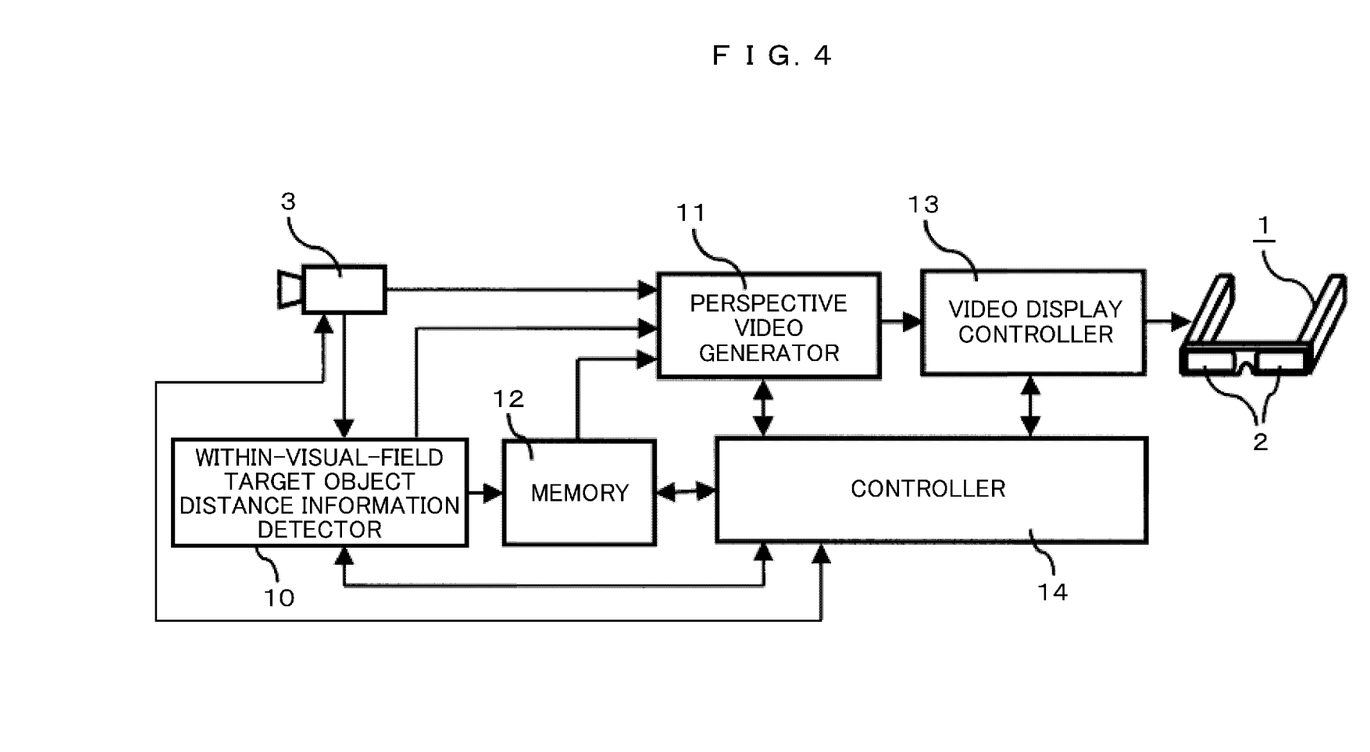
FIG. 4 is a block configuration diagram of an HMD application visual aid system according to Embodiment 1.

FIG. 4 is a block configuration diagram of an HMD application visual aid system according to this embodiment. Hereinafter, the function of each unit illustrated in this block configuration diagram will be described.

In the case illustrated in FIG. 4, external scene video information captured by an electronic camera 3 used for imaging an external scene is transmitted to a within-visual-field target object distance detector 10 and a perspective video generator 11.

The within-visual-field target object distance detector 10 has a function for detecting an actual distance (an actual distance from a user to a target object) up to each target object photographed inside the captured external scene video. In the example illustrated in FIG. 4, while an example in which distance information is detected using a captured video or a distance measurement function included in the electronic camera 3 used for imaging is illustrated, as described above, it is apparent that a dedicated distance measurement sensor or a distance measuring device other than the electronic camera 3 may be used for the detection of the distance information of a target object. In such a case, naturally, the within-visual-field target object distance detector 10 is configured to receive an information signal from the distance measurement sensor or the distance measuring device. In addition, the video information captured by the electronic camera 3 is stored in a memory 12 in a form accompanying distance information of each target object detected by the within-visual-field target object distance detector 10 as is necessary.

A perspective video generator 11 is a core part of the visual aid system according to this embodiment and has a function for generating virtual image videos having depth perception that are independently projected and displayed on video display screens 2 arranged in front of the left and right eyes of an HMD user 20 by using external scene video information captured by the electronic camera 3, distance information of each target object detected by the within-visual-field target object distance detector 10, predetermined video information extracted from the memory 12 as is necessary, and the like. The depth perception providing function of this perspective video generator 11 will be described later.

A display video generated by the perspective video generator 11 is transmitted to a video display controller 13. This video display controller 13 has a function for controlling a virtual image projecting device included in an HMD 1 used for appropriately projecting a display video transmitted from the perspective video generator 11 on projection screens 2 included inside the HMD 1 as a virtual image.

In addition, this video display controller 13 may have a function for controlling an optical system for generating a virtual image included inside the virtual image projecting device such that the visual perception distance of a virtual image can be changed and adjusted to a predetermined distance.

The function and the operation of each of the electronic camera 3 used for imaging an external scene, the within-visual-field target object distance detector 10, the perspective video generator 11, the memory 12, and the video display controller 13 described above are appropriately controlled by the controller 14.

As described above, the perspective video generator 11 among blocks illustrated in FIG. 4 is a core part of this embodiment, and a predetermined processing treatment is performed for virtual image videos that are independently projected and displayed on the left and right video display screens 2 therein, and thus, a virtual image video from which a predetermined depth perception seen from the user 20 is felt is generated. Hereinafter, a specific embodiment for generating depth perspective will be described.

Figure 5:
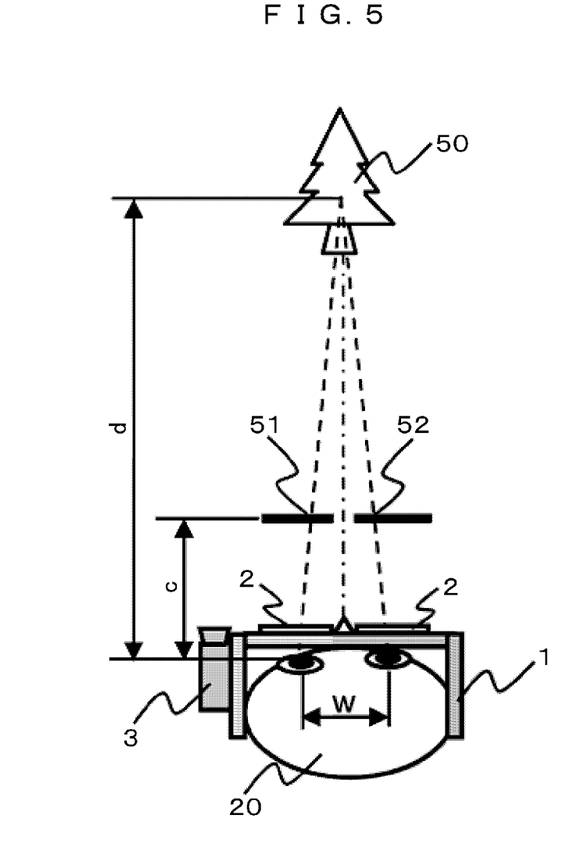
FIG. 5 is an outline plan view for describing binocular parallax of a virtual image according to Embodiment 1.

First, in a case where a person visually recognizes a virtual image, in order to allow the person to feel depth perception, the following three elements are essential.
(1) binocular parallax
(2) shading of a virtual image that corresponds to a distance
(3) alleviation of a strange feeling accompanying convergence of both eyes First, (1) the binocular parallax represents generating a difference in positions of videos (virtual images), which are viewed by the left and right eyes, in the in-plane direction in accordance with a distance from an observer to a target object. FIG. 5 illustrates an example thereof. Here, an actual distance from the user 20 wearing an HMD 1 to a watching actual target object 50 present right in front of the user is denoted by d, and a visible distance c of virtual images 51 and 52 of the target object 50 projected onto left and right projection screens 2 by the HMD 1 is denoted by c. In addition, a gap between the both eyes of the user is denoted by W. At this time, in order to cause the user to feel depth perception similar to that of the actual target object by viewing the virtual images 51 and 52 of the actual target object 50, the virtual images 51 and 52 of the actual target object 50 viewed by the left and right eyes need to be projected onto the positions of intersections between at least straight lines (broken lines in the drawing) joining at least the actual target object 50 and both the left and right eyes of the user and a virtual image visual recognition face that is separate by the visible distance c.

Figure 6:
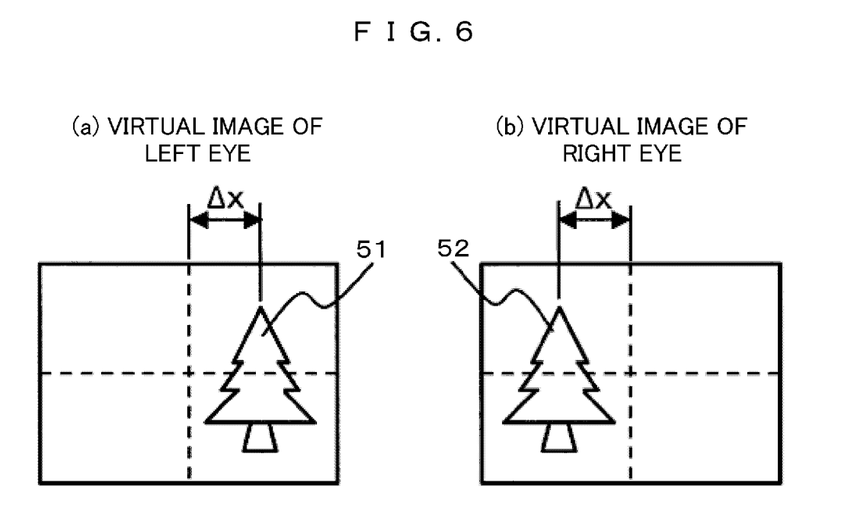
FIG. 6 is an outline front view that illustrates an example of a virtual image to which binocular parallax is applied according to Embodiment 1.

In other words, as illustrated in FIG. 6, the virtual image 51 of the actual target object 50 in the left eye needs to be projected onto a position shifted from the center of the virtual image to the right side by Δx, and a virtual image 52 in the right eye needs to be projected onto a position shifted from the center of the virtual image to the left side by Δx.

The relative shift amount Δx of the left and right virtual images, generally, is represented in the following equation using the actual distance d, the virtual image visible distance c, and a gap W between both the eyes of the observer.

$$\Delta x = (W/2) \times (1 - c/d) \quad (1)$$

In this way, as the relative shift amount Δx, by applying an in-plane direction shift (parallax) to virtual image videos projected into both the left and right eyes that is in approximately inverse proportion to a distance from an observer (an HMD user in the case of this embodiment) to a watching target object, it helps the observer to feel depth perception.

Next, (2) the shading of a virtual image corresponding to a distance represents application of a predetermined "shading" to a virtual image video for each target object video within a projected virtual image in correspondence with an actual distance of a target object considering that the human visual ability is approximately in inverse proportion to a distance up to a target object as described above.

Figure 7:
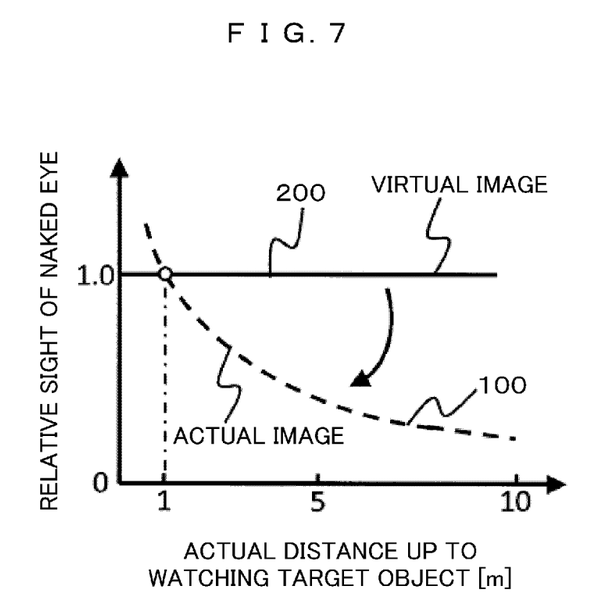
FIG. 7 is a line drawing that illustrates a relation among an actual distance up to a watching target object, relative sight for a real image acquired by seeing the target object through naked eyes, and relative sight of a virtual image according to Embodiment 1.

FIG. 7 illustrates an example thereof. FIG. 7, similar to FIG. 3, represents a human relative sight characteristic, and the horizontal axis and the vertical axis are similar to those illustrated in FIG. 3. As described above, relative sight for a real image acquired by directly viewing a target object using naked eyes, as denoted by a broken line 100 in the drawing, decreases approximately in inverse proportion to the actual distance of the target object.

On the other hand, in a case where a scene imaged by a camera is seen as a virtual image, the visual recognition position of the virtual image is fixed regardless of a visual recognition position of the virtual image being near/far from the target object, and accordingly, the relative sight for the virtual image video of the target object, as denoted by a solid line 200 in the drawing, has a fixed value regardless of the actual distance up to the target object. This is an important factor blocking a depth perception sense of the virtual image.

Thus, by applying a "shading" of an amount that is approximately in proportion to the actual distance information of a target object to each target object video shown inside a video projected as a virtual image in advance, even a virtual image located at the same visible distance approaches the relative sight characteristic curve 100 for a real image according to naked-eye viewing, and it can help the observer to feel depth perception on the basis of the relative sight characteristic effect.

In addition, at this time, in order to optimize the visibility of a target object watched by a user, the "shading" amount corresponding to an actual distance up to the target object may be appropriately adjusted such that relative sight for the actual distance up to the watching target object is optimized.

Furthermore, regarding the specifying of a watching target object, a target object located at the center within the imaging visual field that approximately matches between the naked eyes of the user may be specified as a watching target object of the user, or a visual line direction of a user may be detected, and a target object present in the visual line direction may be specified as a watching target object.

Finally, (3) the alleviation of a strange feeling according to the convergence of both the eyes is as below. The convergence of both the eyes represents motions (inner rotational motions) of the eyeballs of both the eyes rotating to the inner sides for adjusting the focus of both the eyes to a target object in a case where, particularly, the target object located at a short distance is directly visually recognized. As the brain detects such inner rotational motions of the eyeballs, a person detects depth perception to some degree. Such convergence markedly occurs in a case where the target object is located at a very short distance within several tens of centimeters. On the other hand, in a case where a person views a virtual image, the focus of the eyes of the person matches the visually recognized distance of the virtual image. For this reason, in a case where a virtual image having a visible distance of about several tens of centimeters or more is visually recognized, marked convergence does not occur. However, in a case where the target object is present at a very short distance from the observer, there is a deviation between the depth perception of a virtual image that is arbitrarily given according to the shading of the virtual image corresponding to the binocular parallax described above and the distance and the like and a distance sense detected from the convergence, and the observer strongly feels strangeness and unpleasantness.

An object of this embodiment is to eliminate the strangeness and the unpleasantness felt by the observer (HMD user). Thus, in this embodiment, a technique for applying a predetermined correction of the actual distance of the target object and a scaled distance in a visual sense that is given to the virtual image is proposed.

Figure 8:
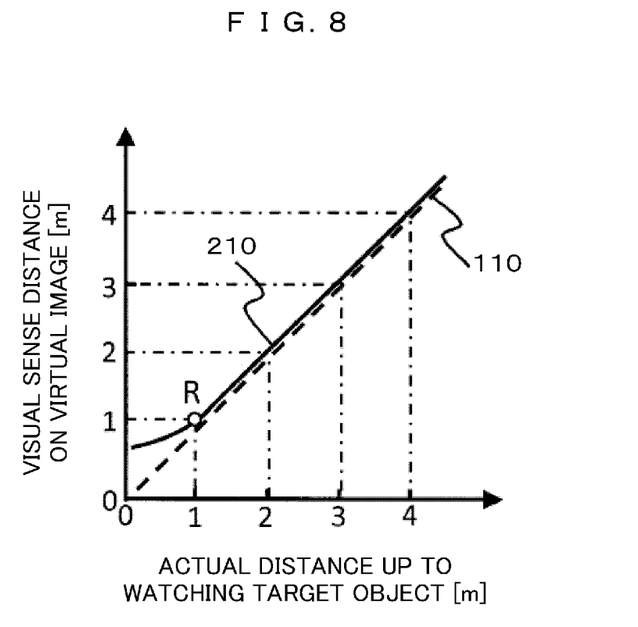
FIG. 8 is a line drawing that illustrates a relation between an actual distance up to a watching target object and a scaled distance in a visual sense applied to a target object video inside a virtual image according to Embodiment 1.

FIG. 8 illustrates one example thereof. This diagram is a graph in which a relation (hereinafter, this relation will be referred to as a distance scaling characteristic) between the actual distance up to a watching target object and a scaled distance in a visual sense that is given to each target object video inside the virtual image in this embodiment is plotted.

Originally, it is ideal that the actual distance (horizontal axis) up to a target object and a scaled distance (vertical axis) in a visual sense that is given to a target object video inside the virtual image precisely match each other. In other words, it is ideal that the distance scaling characteristic described above has a linear relation having a slope (a coefficient of proportion) of 1.0 as in a broken line 110 illustrated in FIG. 8. However, as described above, when such a correct distance relation is maintained, particularly in a short-distance area, there is a large deviation between the depth perception that is arbitrarily given to a virtual image as described above and a distance detected from the convergence.

Thus, in this embodiment, a function of calculating a scaled distance according to a distance scaling characteristic on a curve, for example, as represented by a solid line 210 in the drawing in which a straight line 110 representing the original correct distance relation is followed in an intermediate distance/long-distance area and, in a short-distance area located nearer than a predetermined point R (in the example illustrated in the drawing, an actual distance of 1 m), a coefficient of proportion of the amount of change in the distance in the visual sense that is given to a virtual image video with respect to the amount of change in the actual distance up to the target object is gradually decreased from 1.0 in accordance with a decrease in the actual distance up to the target object is included in the within-visual-field target object distance detector 10 or the perspective video generator 11.

Then, on the basis of the scaled distance calculated as described above, the perspective video generator 11 calculates a binocular parallax amount given to virtual image videos used for the left eye and the right eye respectively projected onto the left-eye and right-eye video display screens 2 and the amount of shading of an image according to the distance and performs a processing treatment of the videos to apply the amounts. By performing such a treatment, a deviation between the depth perception that is arbitrarily given to virtual image videos and the convergence is decreased, and the strangeness and the unpleasantness felt by the observer (HMD user) can be eliminated.

However, in a case where the coefficient of proportion of the amount of change in the distance in the visual sense given to virtual images with respect to the amount of change in the actual distance in the short-distance area is gradually decreased from 1.0 in this way, naturally, the fidelity of the depth perception of virtual images with respect to the depth perception of the actual target object deteriorates in that area. However, particularly, in a case where a short-distance target object is watched, as in a case where a book, a newspaper, or the like is read, mostly only the target object is strongly watched, and there is a rare case in which there is a concern about the depth perception with a surrounding scene. Accordingly, it is more practical for the visual aid system to eliminate the strangeness and the unpleasantness felt by the observer (HMD user) than to secure the fidelity of the depth perception of the target object.

The distance scaling characteristic 210 illustrated in FIG. 8 is merely an example, it is apparent that this embodiment is not limited thereto. According to the individual characteristic or taste of the user or surrounding environments or situations, the location (actual distance) of the inflection point R of the distance scaling characteristic or the shape of the distance scaling characteristic curve on a short-distance side nearer than R may be arbitrarily set. Any characteristic may be used as long as the characteristic is a distance scaling characteristic in which the scaled distance in the visual sense that is given to virtual images is longer than the actual distance up to the target object by a predetermined amount or a predetermined ratio on the short-distance side from a predetermined distance point.

As described above, by performing a predetermined treatment for videos projected onto the projection screens 2 of the HMD 1 arranged in front of the left and right eyes of the user so as to alleviate a strange feeling accompanying the (1) binocular parallax, (2) the shading of virtual images according to the distance, and (3) alleviation of the strange feeling accompanying the convergence of both eyes, the user can visually recognize an external scene with a good visual recognition characteristic without causing a strange feeling and an unpleasant feeling for the depth perception of virtual images.

Figure 9:
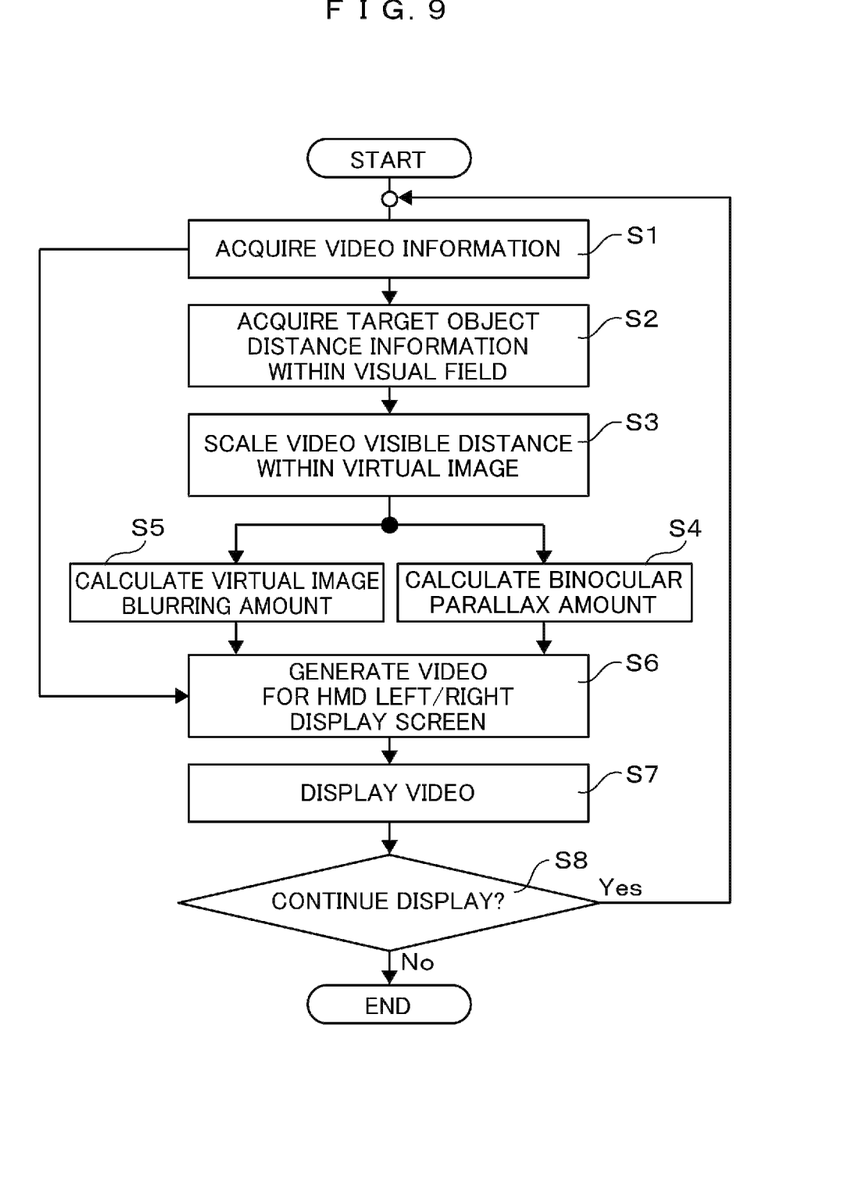
FIG. 9 is a flowchart that illustrates a process flow according to Embodiment 1.

Next, the process flow of the visual aid system according to this embodiment will be described with reference to a flowchart illustrated in FIG. 9. In the case illustrated in FIG. 9, first, in Step 1 (S1), predetermined video information is sequentially acquired from the electronic camera 3 used for imaging an external scene. Next, in Step 2, the actual distance information of each target object within the imaging visual field is acquired. Next, in Step 3, by using the actual distance information of each target object acquired in Step 2, a scaled distance in the visual sense that is given to each target object video inside a virtual image is calculated as a convergence in accordance with the distance scaling characteristic described above. Next, in Step 4, the "binocular parallax amount" given to virtual image videos of the left and right eyes is calculated, for example, by using Equation (1) described above on the basis of the visual sense scaled distance of virtual images scaled in Step 3.

Similarly, in Step 5, a predetermined "shading amount" to be given to virtual image video of each target object is calculated on the basis of the visual sense of the virtual images scaled distance scaled in Step 3.

Next, in Step 6, by processing the video information acquired in Step 1 by using depth perception building parameters such as the "binocular parallax" and the "shading amount" calculated in Steps 4 and 5, virtual image videos to be projected onto the left and right video display screen 2 disposed inside the HMD 1 are generated.

Finally, in Step 7, left and right virtual image videos generated in Step 6 are projected and displayed onto the left and right video display screens 2 disposed inside the HMD 1. Then, in subsequent Step 8, it is determined whether or not the series of the process flow is to be continued. When a result of the determination is "Yes", the process is returned to Step 1 again. On the other hand, in a case where a result of the determination is "No", the series of the process flow ends.

When the process flow described above ends, a state is formed in which no video is shown on the video display screens 2 arranged in front of the eyes of the user 20. These video display screens 2 are basically non-transparent, and it is difficult to visually recognize an outer scene using the naked eyes in a state nothing is shown, and accordingly, it is very dangerous unless the HMD is taken off. Thus, for example, these video display screens 2 are configured using liquid crystal-type light control glass or the like, and switching between a transparent state and a non-transparent state can be performed by turning on/off of the voltage. In this way, when the function of the visual aid system is in an operated state, the video display screens function as non-transparent video display screens, and, when the operation of the system is turned off, the video display screens 2 are automatically in a transparent or semi-transparent state, and an external scene can be visually recognized using the naked eyes, and it is safe to constantly wear the HMD.

In the HMD application visual aid system according to this embodiment illustrated in FIG. 4, each block configuration part may be formed integrally with or separately from the HMD 1. In addition, the appropriate visible distance C of virtual images may be set to be changeable by the user.

As above, this embodiment is a head mounted display device that is mounted in a head portion of a user and displays information videos in front of the eyes and is configured to include: an external scene imaging unit that captures an external scene in a visual field area including a direct visually-recognized visual field of the user; a virtual image projector that projects and displays the external scene video captured by the external scene imaging unit on left-eye and right-eye video display screens separately arranged in front of the eyes of the user as left-eye and right-eye virtual image videos having a predetermined visible distance; an within-visual-field target object distance detector that detects an actual distance up to a target object shown inside the external scene video captured by the external scene imaging unit from the user; and a perspective video generator that generates virtual image videos to which depth perception is added by performing a predetermined treatment of the left-eye and right-eye virtual image videos on the basis of actual distance information of the target object detected by the within-visual-field target object distance detector.

In addition, there is provided a video display method of a head mounted display device that is mounted in a head portion of a user and displays information videos in front of the eyes. The video display method includes: capturing an external scene video in a visual field area of the user; detecting an actual distance up to a target object shown inside the external scene video from the user; projecting and displaying the captured external scene video on left-eye and right-eye video display screens separately arranged in front of the eyes of the user as left-eye and right-eye virtual image videos having a predetermined visible distance; and adding depth perception to the left-eye and right-eye virtual image videos on the basis of actual distance information of the detected target object.

In this way, a visual aid system capable of securing good visual recognition performance in accordance with an individual visual ability while maintaining depth perception using an HMD can be realized.

Embodiment 2

Figure 10:
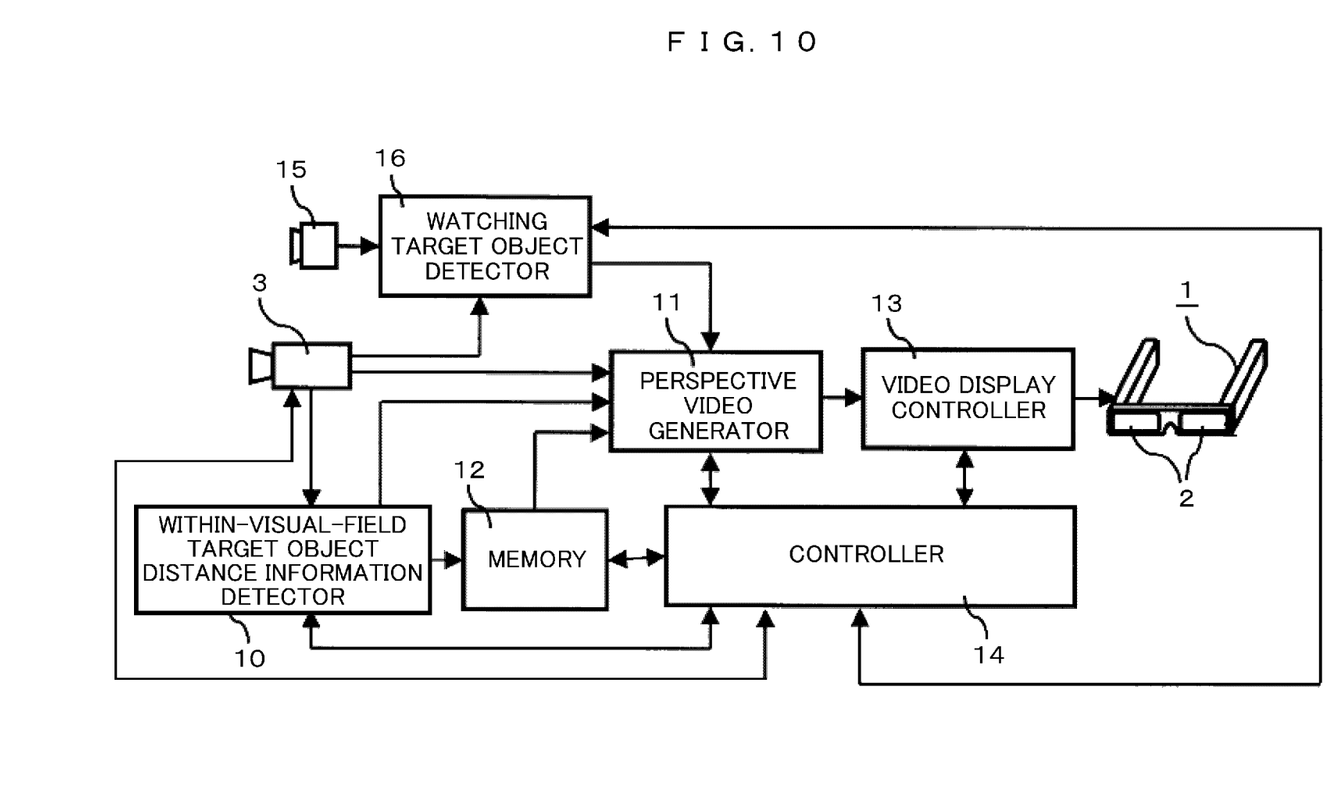
FIG. 10 is a block configuration diagram of an HMD application visual aid system according to Embodiment 2.

FIG. 10 illustrates a block configuration diagram of an HMD application visual aid system according to this embodiment. In this block diagram, the same reference numeral is assigned to the same constituent element as that of the block diagram illustrated in FIG. 4, and description thereof will not be presented.

In this embodiment, in addition to the constituent elements of Embodiment 1 illustrated in FIG. 4, a visual line direction detector 15 used for detecting the visual line direction of the user 20 and a watching target object detector that detects and specifies a target object at which the user current watches from the visual line direction acquired from the visual line direction detector 15 and an external scene video captured by the electronic camera 3 are included. Then, the "shading amount" assigned to virtual image videos is adjusted such that the watching target object detected and specified by the watching target object detector 16 can be visually recognized with best visibility, and virtual image videos to be projected onto left and right video display screens 2 are generated by the perspective video generator 11.

By employing such a configuration, even in a case where a user watches a target object deviates from the center of the visual field, virtual images of the watching target object can be viewed with an appropriate visual recognition characteristic.

Embodiment 3

Figure 11:
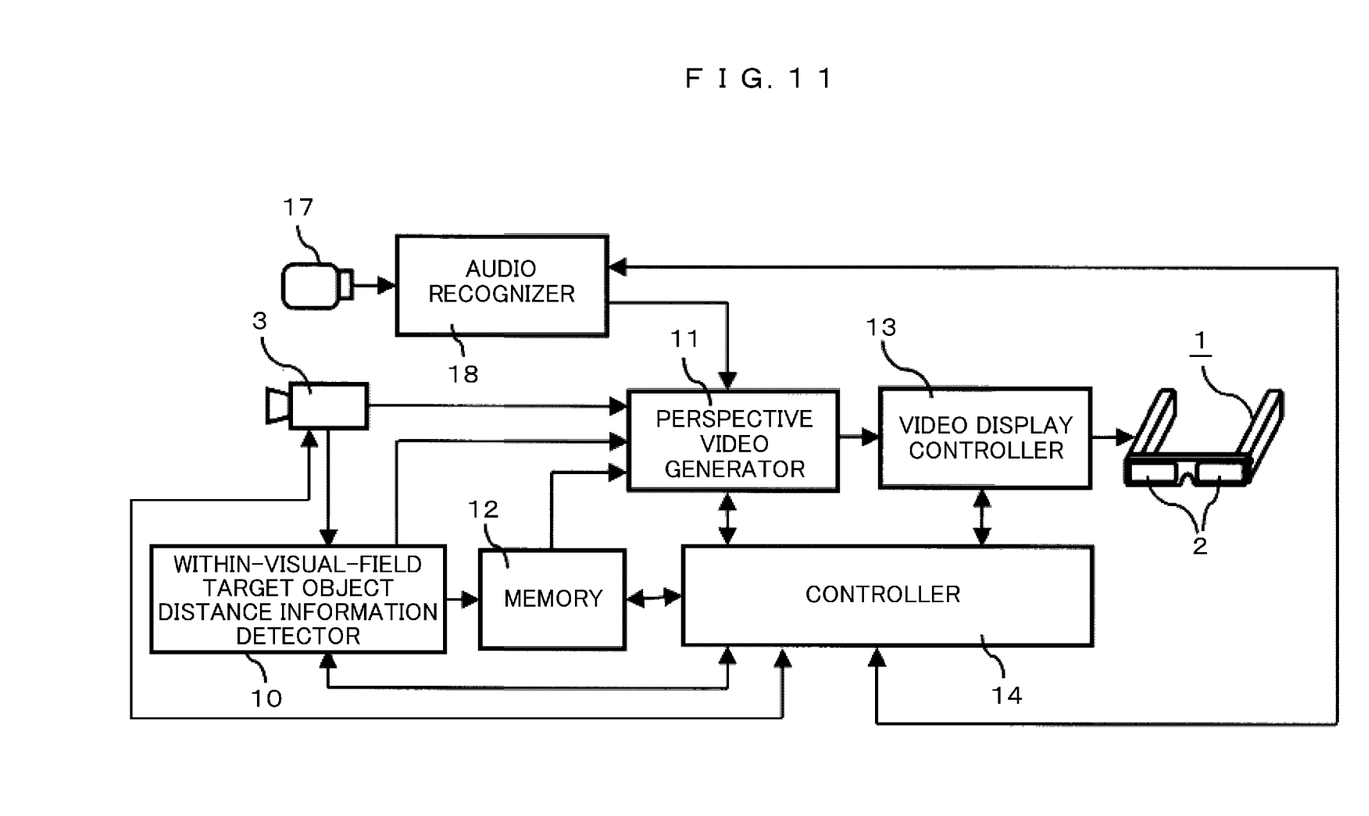
FIG. 11 is a block configuration diagram of an HMD application visual aid system according to Embodiment 3.

FIG. 11 illustrates a block configuration diagram of an HMD application visual aid system according to this embodiment. In this block diagram, the same reference numeral is assigned to the same constituent element as those of the block diagrams illustrated in FIGS. 4 and 10, and description thereof will not be presented.

In this embodiment, in addition to the constituent elements of Embodiment 1 illustrated in FIG. 4, a sound collecting microphone 17 used for collecting speech given off by a user 20 and a speech recognizer 18 recognizing a content of the speech given by the user 20 by analyzing the speech of the user 20 collected by the sound collecting microphone 17 are included.

In this embodiment, for example, when a certain keyword such as "enlarge" or "zoom up" given off by the user 20 is detected, the keyword is recognized by the speech recognizer 18, and a function for zooming up a video captured by an electronic camera 3 used for imaging an external scene at a predetermined magnification ratio may be provided.

Alternatively, inside the system described above, a separate character recognizer or an automatic predetermined language translator may be provided, and, a function for automatically translating an English word, an English sentence, a difficult Chinese character, or the like present with the imaging visual field and displaying a result of the translation on virtual image videos shown on the display screens 2 in an overlapping manner when a keyword such as "translate" is detected and recognized may be provided.

In this way, by arranging a device detecting and recognizing speech of a user, the user can operate various functions relating to the HMD by using only speech, and accordingly, a complete hands-free operation can be performed.

Embodiment 4

Figure 12:
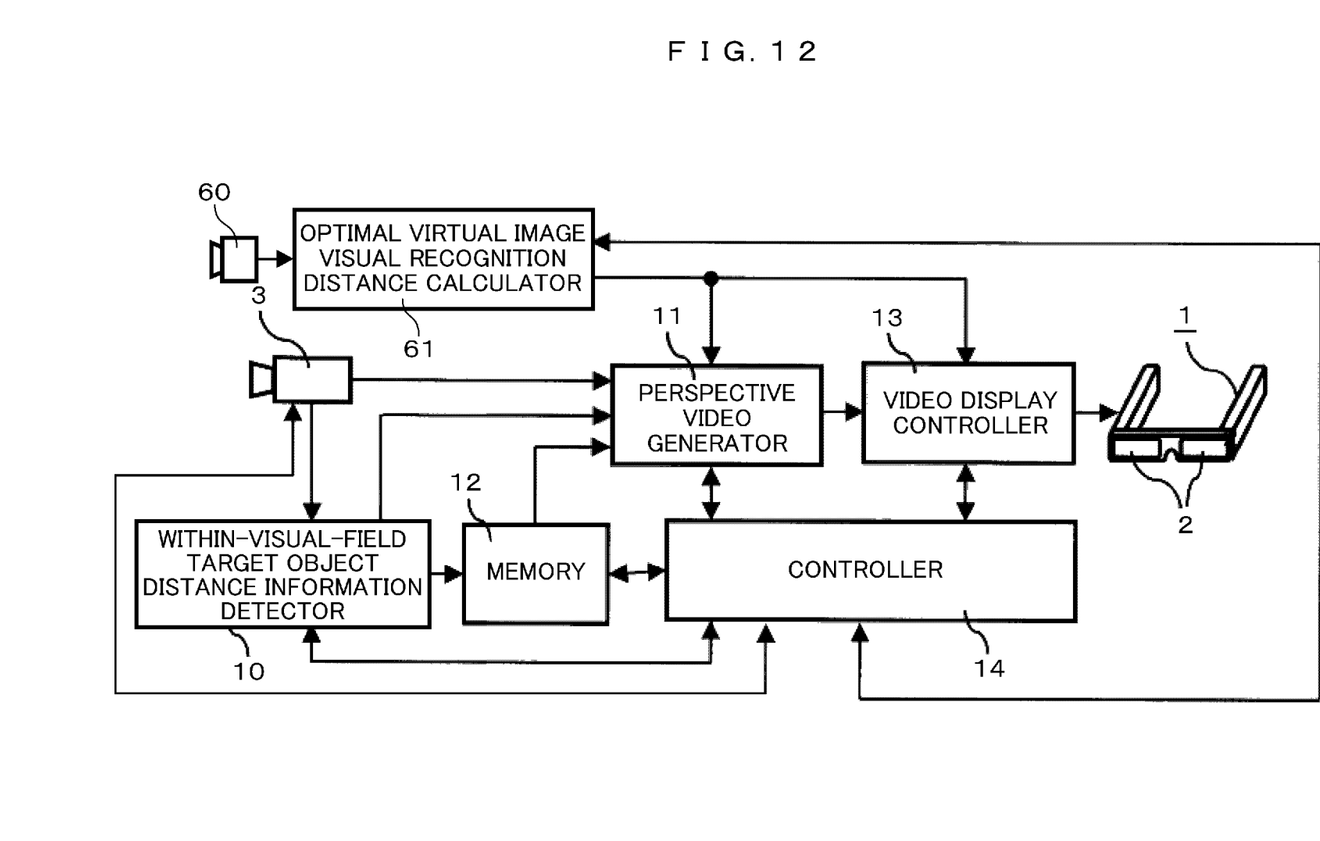
FIG. 12 is a block configuration diagram of an HMD application visual aid system according to Embodiment 4.

FIG. 12 illustrates a block configuration diagram of an HMD application visual aid system according to this embodiment. In this block diagram, the same reference numeral is assigned to the same constituent element as those of the block diagrams illustrated in FIGS. 4, 10, and 11, and description thereof will not be presented.

In this embodiment, in addition to the constituent elements of Embodiment 1 illustrated in FIG. 4, a small-size automatic sight measuring unit (autorefractometer) 60 having a function for automatically measuring the sight of the user 20 wearing the visual aid system according to this embodiment and an optimal virtual image visible distance calculator 61 calculating a virtual image visible distance at which best visibility can be secured for the user on the basis of the sight of the user 20 that is detected by the automatic sight measuring unit 60 are included. Then, optimal virtual image visible distance information calculated by this optimal virtual image visible distance calculator 61 is transmitted to the perspective video generator 11 and the video display controller 13, and a virtual image generating optical system disposed inside the HMD 1 is automatically adjusted through the video display controller 13 such that virtual image videos maintaining good depth perception not giving a strange feeling or an unpleasant feeling to a user having the optimal virtual image visible distance are generated and are projected and displayed on the video display screens.

By employing such a configuration, every time when the user 20 wears this visual aid system, the sight of the user is automatically measured, and a virtual image position can be automatically adjusted to have a virtual image visible distance at which optimal visual recognition performance is acquired for the user.

Embodiment 5

In this embodiment, an example in which the process of the perspective video generator 11 of the HMD application visual aid system is configured as an external process to reduce the processing burden of the HMD application visual aid system will be described.

As described in Embodiment 1 with reference to FIG. 4, the perspective video generator 11 has a function of generating virtual image videos having depth perception that are independently projected and displayed on the video display screens 2 arranged in front of the left and right eyes of the HMD user 20 by using the external scene video information captured by the electronic camera 3, the distance information of each target object detected by the within-visual-field target object distance information detector 10, predetermined video information extracted from the memory 12 as is necessary, and the like and, as described above, performs a process of applying a predetermined treatment for videos projected on the projection screens 2 of the HMD 1 arranged in front of the left and right eyes of the user to achieve the (1) binocular parallax, (2) shading of virtual images according to the distance, and (3) alleviation of a strange feeling accompanying the convergence of both the eyes. For this reason, a case may be considered in which the process of the perspective video generator 11, for example, has a heavy program load or a heavy processing speed load, and the HMD application visual aid system, for example, becomes a bottleneck in a case where the HMD application visual aid system is integrated with the HMD 1 for a decrease in the weight.

For this reason, the process of the perspective video generator 11 may be configured as an external process, and, for example, the external scene video information and the distance information of a target object are transmitted to a cloud through a network, the process of the perspective video generator 11 is performed on the cloud, and processed display videos are configured to be received, processed by the video display controller 13 of the HMD application visual aid system, and displayed on the video display screens 2 of the HMD 1.

In this way, the program load and the processing load of the HMD application visual aid support can be reduced.

The embodiments described above have been described in detail for easy description of the present invention, and thus, all the described configurations do not necessarily need to be included. In addition, a part of the configuration of a certain embodiment may be replaced by the configuration of another embodiment, and the configuration of a certain embodiment may be added to the configuration of another embodiment. Furthermore, for a part of the configuration of each embodiment, addition, omission, or replacement of another configuration may be performed. In addition, the configurations or the functions of the embodiments may be combined together.

REFERENCE SIGNS LIST

1 HMD
2 Video display screen
3 External scene imaging electronic camera
10 Within-visual-field target object distance information detector
11 Perspective video generator
15 Visual line direction detector
16 Watching target object detector
17 Speech microphone
20 User
30, 40, and 50 Target object
31, 41, 51, and 52 Virtual image
60 Automatic sight measuring unit
61 Optimal virtual image visible distance calculator

The invention claimed is:

1. A head mounted display device that is mounted in a head portion of a user and displays information videos in front of eyes of the user, the head mounted display device comprising:
an external scene imaging unit that captures an external scene in a visual field area including a direct visually-recognized visual field of the user;
a virtual image projector that projects and displays the external scene video captured by the external scene imaging unit on left-eye and right-eye video display screens separately arranged in front of the eyes of the user as left-eye and right-eye virtual image videos having a predetermined visible distance;
a within-visual-field target object distance detector that detects an actual distance up to a target object shown inside the external scene video captured by the external scene imaging unit from the user; and
a perspective video generator that generates virtual image videos to which depth perception is added by performing a predetermined treatment of the left-eye and right-eye virtual image videos on the basis of actual distance information of the target object detected by the within-visual-field target object distance detector, wherein the perspective video generator has a function of calculating a scaled distance of the visible distance that matches the actual distance in a case where the actual distance of the target object is longer than a predetermined set distance and the scaled distance has a value larger than the actual distance in a case where the actual distance is shorter than the predetermined set distance.

2. The head mounted display device according to claim 1, wherein the scaled distance of the visible distance, that matches the actual distance in the case where the actual distance of the target object is longer than the predetermined set distance, has a characteristic of gradually increasing a coefficient of proportion for a change amount of the actual distance from 1.0 in accordance with a decrease in the actual distance in the case where the actual distance is shorter than the predetermined set distance.

3. The head mounted display device according to claim 1, wherein the perspective video generator has a function of applying an in-plane direction deviation corresponding to a binocular parallax amount that is in inverse proportion to the scaled distance on the basis of the scaled distance of the visible distance for each video of the target object shown in the left-eye and right-eye virtual image videos to the virtual image videos.

4. The head mounted display device according to claim 1, wherein the perspective video generator has a function of applying a video shading amount that is in proportion to the scaled distance on the basis of the scaled distance of the visible distance for each video of the target object shown in the left-eye and right-eye virtual image videos to the virtual image videos.

5. The head mounted display device according to claim 4, further comprising:
  a visual line direction detector that detects a visual line direction of the user; and
  a watching target object detector that detects a target object watched by the user from the visual line direction detected by the visual line direction detector and the external scene video captured by the external scene imaging unit,
  wherein a function of adjusting the video shading amount applied to the virtual image videos such that the watching target object detected by the watching target object detector is visually recognized with good visibility is included.

6. The head mounted display device according to claim 1, wherein the left-eye and right-eye video display screens are liquid crystal-type light control glasses of which transparency changes according to an applied voltage, function as non-transparent screens when the head mounted display device is in an operated state, and function as transparent or semi-transparent glasses when the head mounted display device is in a non-operated state.

7. The head mounted display device according to claim 1, wherein sight correction glass lenses are arranged between the left-eye and right-eye video display screens and the eyes of the user.

8. The head mounted display device according to claim 1, further comprising:
  a sound collecting microphone that is used for detecting speech given by the user; and
  a speech recognizer that recognizes a predetermined keyword given by the user from speech of the user collected by the sound collecting microphone,
  wherein a function of increasing an external scene capturing magnification ratio of the external scene imaging unit to be a predetermined magnification ratio on the basis of a result of the recognition of the keyword is included.

9. The head mounted display device according to claim 1, further comprising:
  a sound collecting microphone that is used for detecting speech given by the user;
  a speech recognizer that recognizes a predetermined keyword given by the user from speech of the user collected by the sound collecting microphone;
  a character recognizer that performs predetermined character recognition from a character video included inside an external scene video captured by the external scene imaging unit; and
  an automatic translator that automatically translates a predetermined language,
  wherein a function of displaying a translated sentence of a foreign word, a foreign sentence, or a difficult Chinese character included in the external scene video to overlap the virtual image videos projected and displayed on the video display screens on the basis of a result of the recognition of the keyword is included.

10. The head mounted display device according to claim 1, further comprising:
  a sight measuring unit that has a function of measuring sight of the user; and
  an optimal virtual image visible distance calculator that calculates a virtual image visible distance at which good visibility can be secured by the user from sight of the user detected by the sight measuring unit,
  wherein a function of automatically adjusting a visible distance of the virtual image videos projected and displayed on the video display screens on the basis of optimal virtual image visible distance information calculated by the optimal virtual image visible distance calculator is included.

11. A video display method of a head mounted display device that is mounted in a head portion of a user and displays information videos in front of eyes of the user, the video display method comprising the steps of:
  capturing an external scene video in a visual field area of the user;
  detecting an actual distance up to a target object shown inside the external scene video from the user;
  projecting and displaying the captured external scene video on left-eye and right-eye video display screens separately arranged in front of the eyes of the user as left-eye and right-eye virtual image videos having a predetermined visible distance;
  adding depth perception to the left-eye and right-eye virtual image videos on the basis of actual distance information of the detected target object; and
  calculating a scaled distance of the visible distance that matches the actual distance in a case where the actual distance of the target object is longer than a predetermined set distance and the scaled distance has a value larger than the actual distance in a case where the actual distance is shorter than the predetermined set distance.

12. A visual aid method using the video display method of the head mounted display device according to claim 11, the visual aid method further comprising the steps of:
  measuring sight of the user;
  calculating the visible distance at which good visibility can be secured by the user from sight of the user; and automatically adjusting a visible distance of virtual image videos projected and displayed on the video display screens on the basis of the calculated visible distance information.

* * * * *